Figure 1:
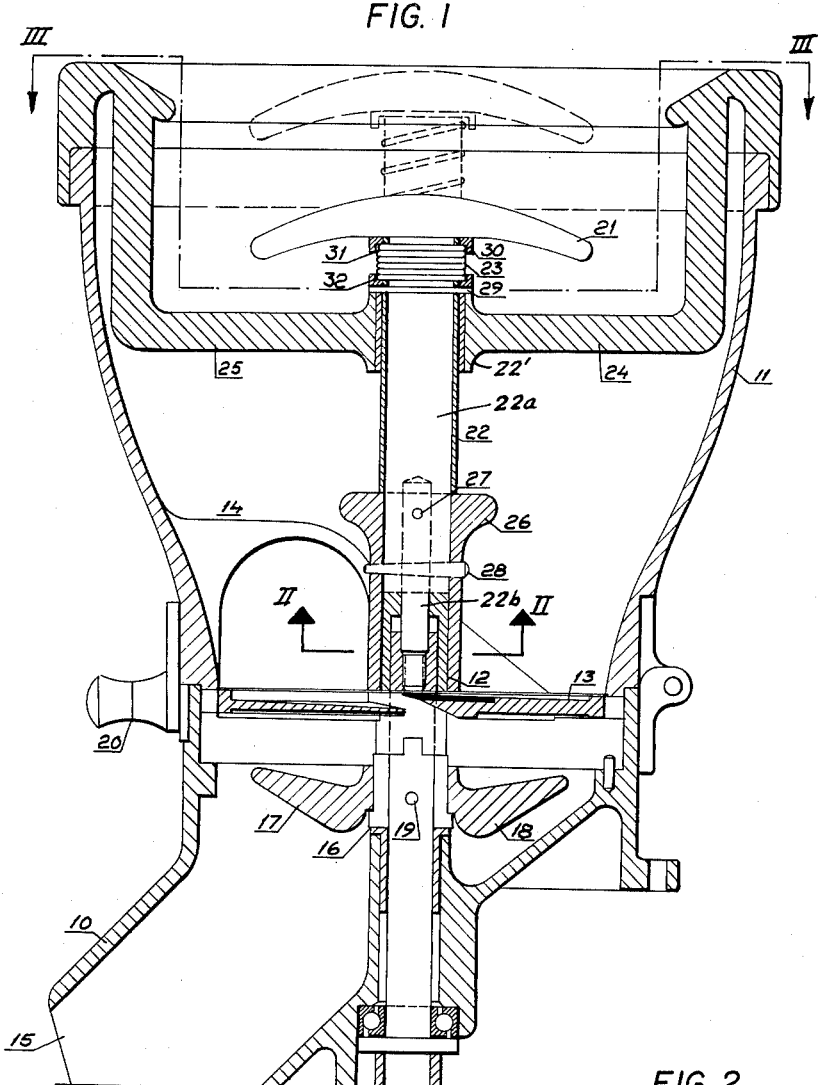

INVENTOR:
Bengt Durling
BY
Richards & Geier
ATTORNEYS

United States Patent Office 3,200,866
Patented Aug. 17, 1965

3,200,866
VEGETABLE SLICING MACHINE
Bengt Durling, Solna, Sweden, assignor to
AB Halldemaskiner, Stockholm, Sweden
Filed May 3, 1963, Ser. No. 277,893
Claims priority, application Sweden, May 24, 1962,
5,852/62
3 Claims. (Cl. 146—124)

The present invention relates to a machine for disintegrating vegetable foodstuffs and the like. The machine comprises a frame in the form of a casing, in which is journalled a vertical spindle rotated by a motor enclosed in said frame, said spindle carrying and rotating a disintegrating member in the form of a disk provided with a cutting edge; a feeding hopper is mounted on the frame above the disintegrating member, the inside of said hopper being provided with feeding or guiding members in the form of one or more diagonally directed blades or the like, which are inclined downwardly in the direction of rotation of the disintegrating member.

Known art disintegrating machines are in the main used in the restaurant industry and the packing industry, where a large capacity is of importance. These machines however have an obvious drawback, in that the foodstuff, when supplying it for further disintegrating, often blocks the feeding down member or guiding member and causes a temporary stoppage in the working cycle. This is especially true when the machine is installed for large volume production where there are serious disadvantages resulting from such intermissions. Such blocking occurs then when one or several roots, e.g., carrots, gather crossways in front of said feeding down member or guiding member, and the risks for such blocking are especially manifest when the food-stuff is supplied under a high concentration so that said foodstuff does not manage to be distributed and gradually fed in. Another frequent case of blocking happens when feeding down larger foodstuffs as for example, turnips, which, when they are too big, cause the same temporary stoppage. This can be rectified only by manually taking away the blocking stuff.

The object of the present invention is to eliminate said drawbacks and a distinctive feature is that the spindle of the motor serves as supporting and driving means for one or more spreading- and/or sorting means, said spreading and/or sorting means being located above and/or below the disintegrating member and facilitating the regular distribution and feeding down and feeding out of said foodstuff. It is advantageous to form the spreading means as a circular, preferably curved disk, the lower part of which has a vertically directed, cylindrical pin, which at the bottom has a bore provided with threads, serving to be removably connected with the upper part of the spindle of the motor.

Such an arrangement thus effectively prevents a blocking of the feeding down or the guiding means, and besides, it aids in distributing the supply of the foodstuff, so that a level spreading is obtained, which increases the capacity of the machine. Another advantage of essential importance is, that the invention serves as an effective protection against accidents, as for example, when one manually endeavors to influence the feeding and might easily come into contact with the disintegrating means with its rotating knives.

To further make clear the basic principle of the invention, the following is a description of a preferred embodiment of the arrangement according to the invention, further characteristics becoming apparent at the same time.

Figure 2:
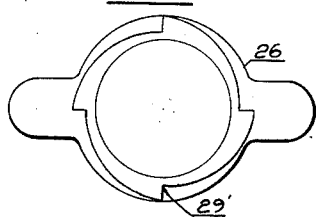
Figure 3:
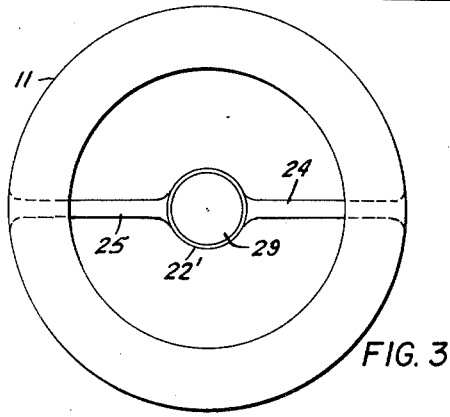

In the description, reference is made to the accompanying drawing, in which:

FIG. 1 is a side view of the arrangement.
FIG. 2 is a top sectional view along the line II—II in FIG. 1 on an enlarged scale.
FIG. 3 is a view along the lines III—III of FIG. 1.

The machine for disintegrating foodstuff, that is only partly illustrated, comprises a casing 10, the upper part of which merges into a vertical cylindrical neck, in the upper part of which is coaxially arranged a feeding down hopper 11, the internal diameter of which increases in an upward direction. In the neck of the casing is coaxially arranged a vertical spindle 12, which carries a cutting or grate member 13 in the form of a circular disk. The cutting member 13 is detachably connected to the spindle 12 and can be provided with knives for cutting the foodstuff or with a grate member for disintegrating the fed down foodstuff into cubes. The construction of this cutting member is the same as that of the knife-carrying disk shown in Patent No. 2,793,667.

The feeding down hopper 11, the lower rim of which is situated immediately above the cutting members 13, is provided at the inner side of its lower edge with guiding member 14 in the form of two inclined, diametrically disposed blades having the shape of propeller blades. The construction of these blades is similar to that of the feeding wings shown in said Patent No. 2,793,667.

The disintegrated foodstuff is fed out from the casing through an only partly indicated feeding out opening 15, arranged at the one side of the casing. This feeding out is facilitated by a member, which is arranged on the spindle 12 beneath the disintegrating member 13, and which member in its most elementary form consists of a cylindrical body 16, having two diametrically disposed wings 17 and 18. This feeding out arrangement 16, 17, 18 is detachably connected with the spindle 12 by slipping the said member over the spindle, which is arranged to rotate the body 16 with its wings 17, 18 by horizontal pins 19. Replacement of the disintegrating member 13 as well as the body 16 with its wings is facilitated by hinging the feeding down hopper on the casing 10 with the aid of a locking device 20.

For facilitating the effective feeding down and level distribution of the foodstuff within the hopper 11, there is disposed on the upper part of the spindle 12 a spreading member, which may have the shape of a circular, preferably convexly formed disk 21 which is integral with a vertical shaft 22a enclosed by sleeves 22' and 22. The shaft 22a is connected with a smaller shaft 22b having screw threads threaded into inner screw threads provided in the upper hollow end of the spindle 12. The spreading member is so arranged that its disk in operative position is a bit beneath the upper rim of the hopper 11. By loosening the thread attachment between the body 22 and the spindle 12, the spreading member can be brought into an inoperative position with the aid of a spring 23. This inoperative position is illustrated with broken lines, in FIGURE 1. The spreading member is guided by a pair of narrow arms 24, 25, having ends which are mounted at the upper part of the hopper 11 and other ends which extend toward the body 22 and are integral with a sleeve 22' mounted upon the sleeve or body 22. The arms 24 and 25 have, for practical reasons, being given a Z-form.

Above the disintegrating member 13 and near the guiding member 14 of the feeding down hopper 11 is arranged a rotatable sorting member 26. This member 26 may have the shape of a tubular body, which is provided with carriers, namely, opposed wings shown in FIG. 2. For further adaptation of the size of the fed down foodstuff the member 26 may be provided with edges 29' or the like (FIG. 2). The member 26 cooperates with the spreading member 21, 22 inasmuch as said spreading member is threaded on the body of the member 26. The member is detachably arranged on the shaft 22a by pins 27, 28.

For further assuring a sufficient feeding in, the upper rim of the hopper 11, or, as in the present embodiment, the upper rim of the arms 24 and 25, may be flanged and show an inclination downwards, through which the risk, that the fed in foodstuff might be thrown out at the contact with the disk 21, is eliminated.

For limitation of the vertical movement of the member 21, 22, there is a plate 29 mounted on top of the sleeve 22'. Further, the bottom of the disk 21 is provided with an annular packing 30 with a recess 31, in which the spring 23 is arranged to rest against the packing. The vertical plane surfaces of the arms 24 and 25 located adjacent the body 22 have similar recesses 32 for receiving the lower end of spring 23.

The members 21, 22 and 26, and also 16, 17 rotate when the foodstuff is fed down and when the traversing gear is turned on. The member 21, 22 takes care of the equal distribution over the guiding member on its way towards the disintegrating member 13. For further preventing of all blocking, the member 26 serves as a further distribution means and, if it is necessary, with the aid of said edges on said member also puts through a further adaption of the size of the foodstuff before the disintegration takes place with the aid of the member 13. The feeding out of the thus disintegrated foodstuff is facilitated by the member 16, 17, the wings of which continuously force said foodstuff through the opening 15.

It will be understood that the invention is not confined to the embodiment described in the text and illustrated in the drawing but may be varied in many ways without departing from the spirit and scope of the invention.

What is claimed is:

1. A machine for disintegrating vegetable foodstuffs and the like, said machine comprising, in combination, a vertical cylindrical casing, a spindle supported rotatably in said casing and extending axially therethrough, a cutting disk for disintegrating foodstuffs firmly connected with said spindle, a feeding down hopper mounted concentrically on said casing and above said cutting disk, guiding blade members carried in said feeding down hopper and extending downwardly inclinedly in the direction of the cutting disk for guiding foodstuffs from the hopper into the path of the cutting disk, a spreading disk member firmly connected with said spindle a distance above the cutting disk for uniformly spreading foodstuffs within said feeding down hopper, a sorting member having a cylindrical hub-like body firmly connected with said spindle between said spreading member and said cutting disk and integral radially extending portions for sorting foodstuffs being fed into the cutting disk, and feeding out means firmly connected with said spindle below said cutting disk for feeding disintegrated foodstuffs out of said casing.

2. A machine in accordance with claim 1, comprising a tubular body, said spreading member having the shape of a downwardly curving disk connected to said tubular body, said tubular body have threads at one end for connecting it with said spindle.

3. A machine in accordance with claim 1, wherein said feeding out means comprises an annular hub removably connected with said spindle, and wings carried by said hub at diametrically opposed locations.

References Cited by the Examiner

UNITED STATES PATENTS

| 263,686 | 9/82 | Clark | 146—126 |
|---|---|---|---|
| 2,621,694 | 12/52 | Nelson et al. | 146—124 |
| 2,793,667 | 5/57 | Hall | 146—124 |
| 2,840,318 | 6/58 | Schnell | 146—124 X |

J. SPENCER OVERHOLSER, *Primary Examiner.*